United States Patent
Yang et al.

(10) Patent No.: US 10,203,942 B2
(45) Date of Patent: Feb. 12, 2019

(54) BINARY-CODE TRANSLATION DEVICE AND METHOD

(71) Applicant: NATIONAL CHIAO TUNG UNIVERSITY, Hsinchu (TW)

(72) Inventors: Wuu Yang, Hsinchu (TW); Tsung-Chun Lin, Taichung (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 18 days.

(21) Appl. No.: 15/712,158

(22) Filed: Sep. 22, 2017

(65) Prior Publication Data

US 2018/0357056 A1  Dec. 13, 2018

(30) Foreign Application Priority Data

Jun. 9, 2017 (TW) .............................. 106119320 A (51) Int. Cl.
  *G06F 9/44* (2018.01)
  *G06F 8/52* (2018.01)
  *G06F 8/41* (2018.01)

(52) U.S. Cl.
  CPC .............. *G06F 8/52* (2013.01); *G06F 8/4441* (2013.01)

(58) Field of Classification Search
  None
  See application file for complete search history.

(56) References Cited

U.S. PATENT DOCUMENTS

| 7,603,704 B2 | 10/2009 | Bruening et al. |
| 2010/0095102 A1 | 4/2010 | Toyoshima et al. |
| 2010/0274551 A1 | 10/2010 | Das et al. |

(Continued)

FOREIGN PATENT DOCUMENTS

| CN | 1892602 A | 1/2007 |
| TW | I474191 B | 2/2015 |

(Continued)

OTHER PUBLICATIONS

Bor-Yeh Shen et al., "LLBT: An LLVM-based Static Binary Translator", Cases' 12: Proceedings of the 2012 International Conference on Compilers, Architectures and Synthesis for Embedded Systems, Oct. 2012, pp. 51-60.
Fabrice Bellard, "QEMU, a Fast and Portable Dynamic Translator", FREENIX Track: USENIX Annual Technical Conference, 2005, pp. 41-46.

(Continued)

*Primary Examiner* — Qamrun Nahar
(74) *Attorney, Agent, or Firm* — CKC & Partners Co., Ltd.

(57) ABSTRACT

A binary-code translation device includes a translation circuit, a memory and a processor. The processor executes a first program code translated from a second code by the translation circuit. The first program code is temporarily stored in the memory and has a program execution address. At least one function library is temporarily stored in the memory and includes a first and a second function, which are located at a first and a second function address in the memory respectively. When the processor is still executing the first program code and calls the first function, the translation circuit translates the first program code to acquire the second function subsequent to the first function, and the processor acquires the second function address. When the first program code calls the first function and the first function is executed completely, the processor directly executes the second function without returning to the program execution address.

10 Claims, 6 Drawing Sheets

(56) References Cited

U.S. PATENT DOCUMENTS

2015/0301848 A1   10/2015   Roehrig et al.

FOREIGN PATENT DOCUMENTS

| TW | I482094 B | 4/2015 |
| TW | I514266 B | 12/2015 |

OTHER PUBLICATIONS

Bor-Yeh Shen et al., "An LLVM-based Hybrid Binary Translation System", 7th IEEE International Symposium on Industrial Embedded Systems (SIES), 2012.

BINARY-CODE TRANSLATION DEVICE AND METHOD

CROSS-REFERENCE TO RELATED APPLICATION

This application claims priority to Taiwan Application Serial Number 106119320, filed Jun. 9, 2017, which is herein incorporated by reference.

BACKGROUND

Field of Invention

The disclosure relates to a binary-code translation device and method, particularly to a dynamic binary-code translation device and method.

Description of Related Art

With booming of cloud calculation, cloud data are accessed and applied between different platforms. Since different processors are possibly used between the different platforms and the cloud data are converted between the different platforms, a cross-platform virtualization technology emerges as the times require and becomes an important key topic of a cloud technology. Dynamic binary-code translation is a core technology for cross-platform virtualization. In the dynamic binary-code translation process, indirect branch caused by function returning may lead to a problem that the processing speed is reduced and thus the efficiency of the entire system is poor.

SUMMARY

The disclosure provides a binary-code translation device including a translation circuit, a memory and a processor. The translation circuit is configured to translate a second program code to a first program code. The processor is configured to execute the first program code translated by the translation circuit. The first program code is temporarily stored in the memory and has a program execution address, at least one function library is temporarily stored in the memory, the at least one function library includes a first function and a second function, and the first function and the second function are located at a first function address and a second function address in the memory respectively. When the processor is still executing the first program code and calls the first function, the translation circuit is utilized to translate the first program code to acquire the second function subsequent to the first function, and the processor acquires the second function address of the second function located in the memory. When the first program code calls the first function and the first function is executed completely, the processor directly executes the second function located at the second function address without returning to the program execution address.

The disclosure also provides a binary-code translation method including the following steps. A second program code is translated to a first program code, wherein the first program code is temporarily stored in a memory and has a program execution address, at least one function library is temporarily stored in the memory, the at least one function library includes a first function and a second function, and the first function and the second function are located at a first function address and a second function address in the memory respectively. The translated first program code is executed by the processor. When the processor is still executing the first program code and calls the first function, the first program code is translated to acquire the second function subsequent to the first function, and the processor acquires the second function address of the second function located in the memory. When the first program code calls the first function and the first function is executed completely, the processor directly executes the second function located at the second function address without returning to the program execution address.

The disclosure further provides a binary-code translation device including a processor and a memory. When the processor executes a first instruction for storing a variable to a first position of the memory and the variable is relevant with an address of the memory, if a second instruction for storing the variable to a second address of the memory exists subsequent to the first instruction and several instructions irrelevant with the variable exist between the first instruction and the second instruction, the processor only executes the first instruction.

The disclosure also provides a binary-code translation device including a processor and a memory. When the processor executes a first instruction for accessing a variable from the memory to a first register and the variable is relevant with an address of the memory, if a second instruction for accessing the variable from the memory to a second register exists subsequent to the first instruction and several instructions irrelevant with the variable exist between the first instruction and the second instruction, the processor only executes the second instruction.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
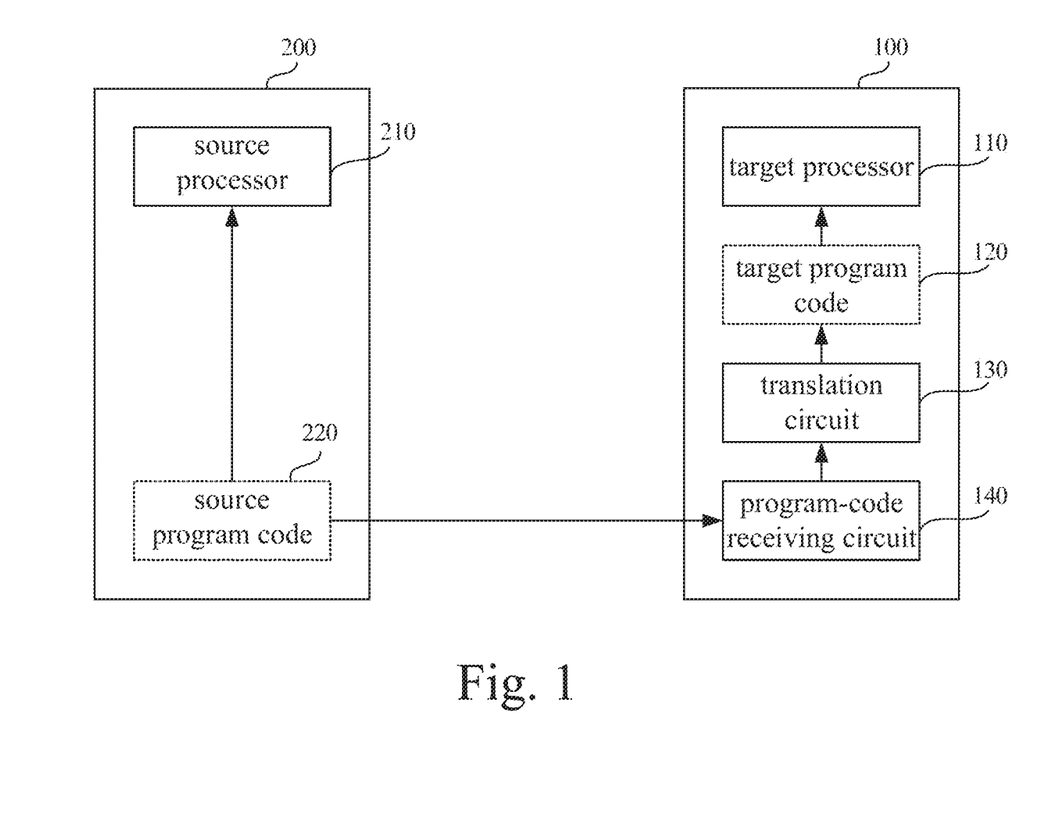
FIG. 1 is a schematic view of binary-code translation between different devices illustrated in accordance with an embodiment of the disclosure.

FIG. 1 is a schematic view of binary-code translation between different devices illustrated in accordance with an embodiment of the disclosure. Referring to FIG. 1, a source device 200 includes a source processor 210, and a source program code 220 is a program code suitable for being processed in the source processor 210. Further referring to FIG. 1, in an embodiment, a target device 100 utilizes a program-code receiving circuit 140 to receive the source program code 220 from the source device 200. Generally, the target device 100 and the source device 200 are different systems. In the target device 100, a translation circuit 130 is used to translate the source program code 220 in the program-code receiving circuit 140 to obtain a target program code 120 suitable for being processed in a target processor 110.

In an embodiment, the target processor 110 may be an ARM processor, a system on chip (SoC), MIPS processor, an x86 processor, a digital signal processor (DSP) or a PowerPC.

In an embodiment, the source processor 210 may be an ARM processor, an SoC, an MIPS processor, an x86 processor, a DSP or a PowerPC.

Figure 2:
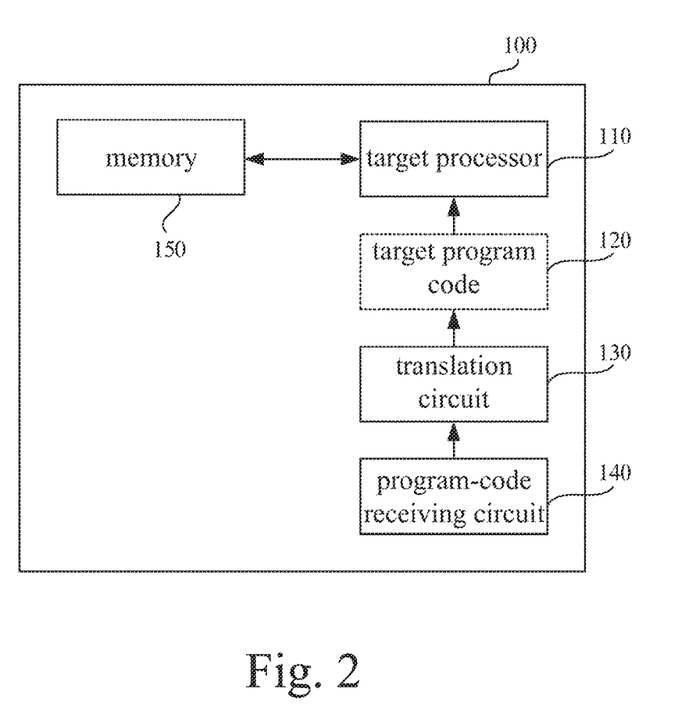
FIG. 2 is a schematic view of binary-code translation and execution in a target device illustrated in accordance with an embodiment of the disclosure.

FIG. 2 is a schematic view of binary-code translation and execution in a target device 100 illustrated in accordance with an embodiment of the disclosure. The target device 100 includes a translation circuit 130, a memory 150 and a target processor 110. The translation circuit 130 is configured to translate a source program code 220 to a target program code 120. The target processor 110 is configured to execute the target program code 120 translated by the translation circuit 130.

Figure 3:
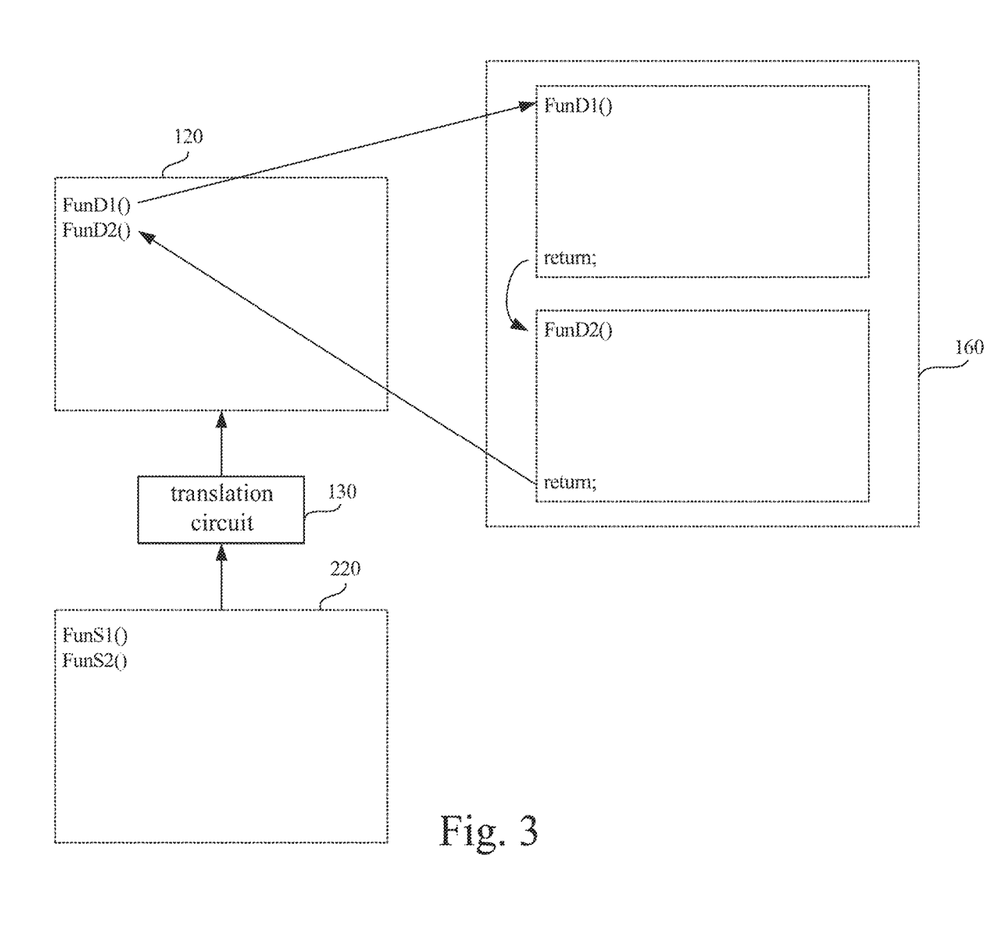
FIG. 3 is a schematic view of a target program-code execution function illustrated in accordance with an embodiment of the disclosure.

FIG. 3 is a schematic view of a target program-code execution function illustrated in accordance with an embodiment of the disclosure. A target program code 120 is a program code applicable to a target processor 110, and a source program code 220 is a program code applicable to a source processor 210. After a first source function FunS1( ) is called in the source program code 220, a second source function FunS2( ) is called immediately. The first source function FunS1( ) and the second source function FunS2( ) both exist in a source function library (not shown). Similarly, a first target function FunD1( ) and a second target function FunD2( ) also exist in the target program code 120 translated from the source program code 220, and after the first target function FunD1( ) is called in the target code 120, the second target function FunD2( ) is called immediately. The first target function FunD1( ) and the second target function FunD2( ) both exist in the source function library 160.

Figure 4:
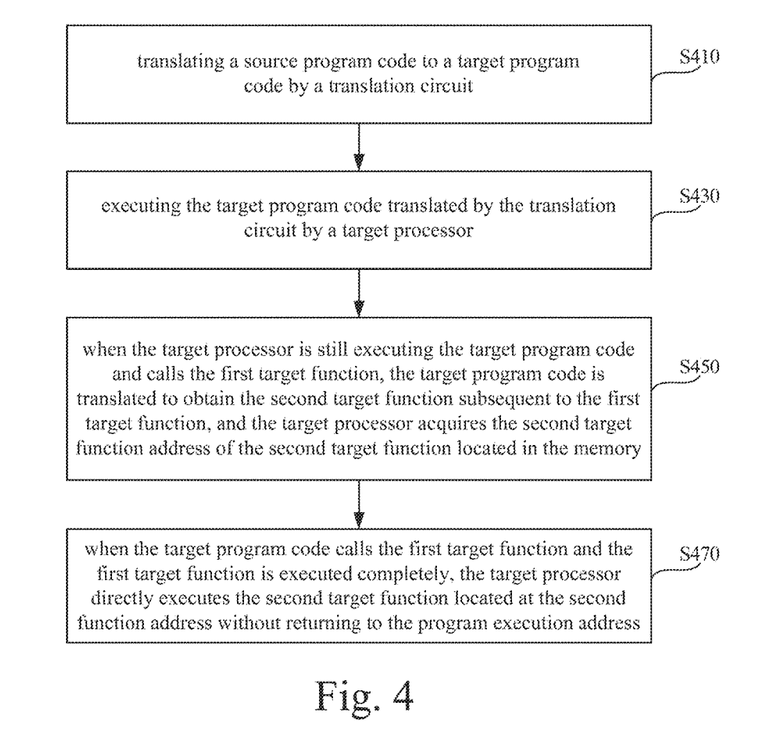
FIG. 4 is a flow chart of a method for binary-code translation and execution in a target device illustrated in accordance with an embodiment of the disclosure.

FIG. 4 is a flow chart of a method for binary-code translation and execution in a target device illustrated in accordance with an embodiment of the disclosure. Referring to FIGS. 2, 3 and 4 simultaneously, in Step S410, first of all, a translation circuit 130 translates a source program code 220 to a target program code 120.

The target program code 120 is temporarily stored in a memory 150 and has a program execution address. The program execution address is namely a return address of a first target function FunD1( ). Generally, the return address is temporarily stored in a link register, so that after the function is executed completely, a processor hops back to the original program execution address to continually execute the program code. A source function library 160 is temporarily stored in the memory 150 and includes several functions, wherein the source function library 160 includes a first target function FunD1( ) and a second target function FunD2( ). The first target function FunD1( ) and the second target function FunD2( ) are located at a first target function address and a second target function address of the memory 150 respectively.

In Step S430, a target processor 110 is configured to execute the target program code 120 translated by the translation circuit 130.

Generally, during static binary-code translation, since the program code is translated completely, it is known that it hops to the second target function address of the second target function FunD2( ) after the first target function FunD1( ) is executed. Therefore, the second target function address can be learnt about easily for hopping. However, during dynamic binary-code translation, since the program code is not translated completely, and a next section is translated while a section is executed, the second target function address is unknown.

Therefore, in Step S450, the disclosure provides a mechanism capable of improving processing efficiency of dynamic binary-code translation. When the target processor 110 is still executing the target program code 120 and calls the first target function FunD1( ) the target program code 120 is translated to obtain the second target function FunD2( ) subsequent to the first target function FunD1( ) and the target processor 110 acquires the second target function address of the second target function FunD2( ) located in the memory 150.

Finally, in Step S470, when the target program code 120 calls the first target function FunD1( ) and the first target function FunD1( ) is executed completely, the target processor 110 directly executes the second target function FunD2( ) located at the second function address without returning to the program execution address.

In accordance with the aforementioned steps, before the first target function FunD1( ) returns, the target processor 110 has translated the second target function address from the source program code 220 and directly executes the second target function FunD2( ) subsequent to the first target function FunD1( ) by replacing the program execution address (namely the return address) with the second target function address, and thus the dynamic binary-code translation can be more efficient.

Figure 5:
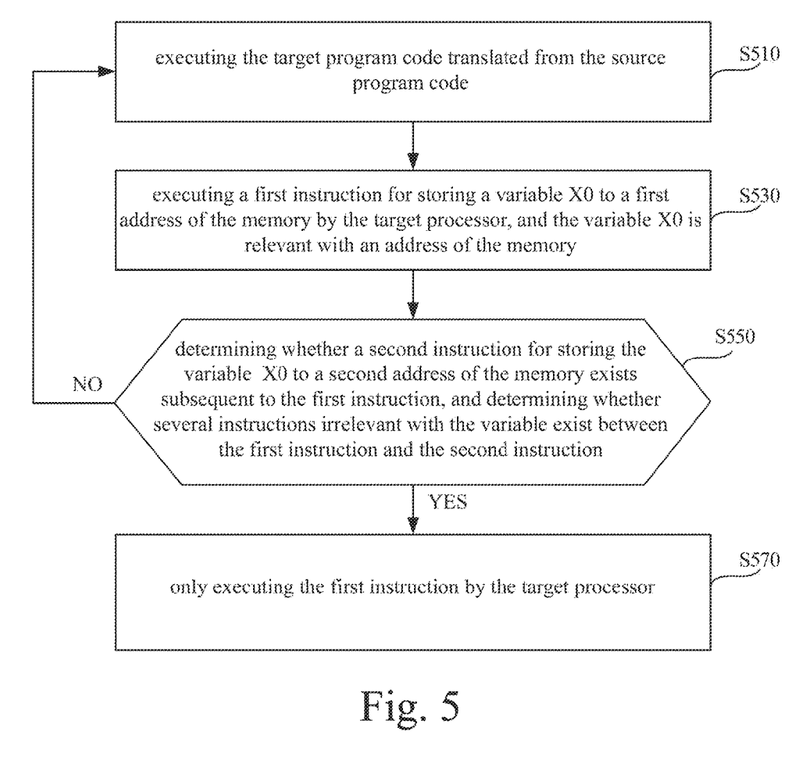
FIG. 5 is a flow chart of a method for binary-code translation and execution in a target device illustrated in accordance with another embodiment of the disclosure.

FIG. 5 is a flow chart of a method for binary-code translation and execution in a target device illustrated in accordance with another embodiment of the disclosure. In accordance with the following steps, redundant access of the memory in the program code can be eliminated.

Reference is made to FIGS. 2 and 5 at the same time. First, in Step S510, the target processor 110 executes the target program code 120 translated from the source program code 220. In Step S530, the target processor 110 executes a first instruction for storing a variable X0 to a first address of the memory 150, and the variable X0 is relevant with an address of the memory 150. In Step S550, it is determined whether a second instruction for storing the variable X0 to a second address of the memory 150 exists subsequent to the first instruction, and it is determined whether several instructions irrelevant with the variable exist between the first instruction and the second instruction. If so, it proceeds to Step S570, in which the target processor 110 only executes the first instruction. If not, it returns to Step S510, in which the target program code 120 is executed continually.

Reference is made to FIGS. 2 and 5 and the following instruction code. The following instruction code is an example of an instruction for storing data to a memory according to a step in FIG. 5. An address of the memory is located in the variable X0, and this definite address can be learnt only during execution. Between two access instructions on the same global variable for emulating a register, a second instruction (it is an access instruction) cannot be cancelled. It is because in the static binary-code translation process, it cannot be leant whether an address of an instruction for storing data to the memory is the same as an address of the global variable for emulating the register. However, in the dynamic binary-code translation process, the address of the memory is an instruction for storing data to the memory in the variable X0, this address is translated from an operational instruction of a source memory, and the memory instruction operating range is a source binary-code image or an emulated stack provided by a binary-code translation system. However, the memory address of the global variable for emulating the register is in the binary-code translation system itself, and memory blocks of the two instructions are different. Thus, the second instruction can be cancelled. That is, in Step S570, the target processor 110 only executes this first instruction.

%2=load i64*@X0 store i64%0, i64*%1%

%3=load i64*@X0

Reference is made to FIGS. 2 and 5 and the following program code. The following program code is an embodiment of an instruction for storing data to a memory according to a step in FIG. 5. An address of the memory is located in the variable X0. Between two storage and access instructions on the same global variable for emulating a register, an access instruction (i.e., a second instruction) on the global variable for emulating the register can be cancelled (in Step S570). That is, data of the storage instruction on the global variable for emulating the register is directly taken for use.

store i64 %2, i64*@X0 store i64 %0, i64* %1

%3=load i64*@X0

Figure 6:
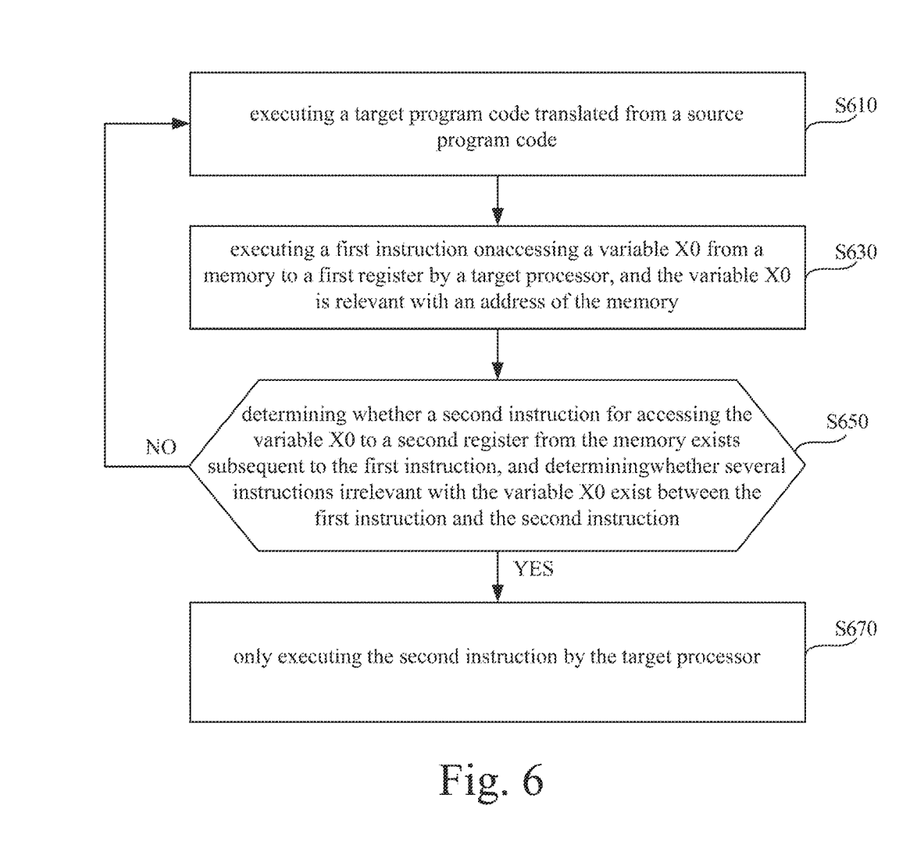
FIG. 6 is a flow chart of a method for binary-code translation and execution in a target device illustrated in accordance with a further embodiment of the disclosure.

FIG. 6 is a flow chart of a method for binary-code translation and execution in a target device illustrated in accordance with a further embodiment of the disclosure. In accordance with the following steps, redundant access on the memory in the code can be cancelled.

Reference is made to FIGS. 2 and 6 at the same time. First, in Step S610, a target processor 110 executes a target program code 120 translated from a source program code 220. In Step S630, the target processor 110 executes a first instruction on accessing a variable X0 from a memory 150 to a first register, and the variable X0 is relevant with an address of the memory 150. In Step S650, it is determined whether a second instruction for accessing the variable X0 to a second register from the memory 150 exists subsequent to the first instruction, and it is determined whether several instructions irrelevant with the variable X0 exist between the first instruction and the second instruction. If so, it proceeds to Step S670, in which the target processor 110 only executes the second instruction. If not, it returns to Step S610, in which the target program code 120 is executed continually.

Reference is made to FIGS. 2 and 6 and the following program code. The following program code is an example of an instruction for accessing data from the memory according to a step in FIG. 6. An address of the memory is located in the variable X0. Between two storage instructions on the same global variable for emulating a register, a first storage instruction (namely a first instruction) can be cancelled. That is, in Step S670, the target processor 110 only executes the second instruction.

store i64 %1, i64*@X0

%3=load i64* %0 store i64 %2, i64*@X0

Although specific embodiments of the disclosure have been disclosed with reference to the above embodiments, these embodiments are not intended to limit the disclosure. Various alterations and modifications can be performed on the disclosure by those of ordinary skills in the art without departing from the principle and spirit of the disclosure. Thus, the protective scope of the disclosure shall be defined by the appended claims.

What is claimed is:

1. A binary-code translation device, comprising:
   a translation circuit configured to translate a second program code to a first program code;
   a memory; and
   a processor configured to execute the first program code translated by the translation circuit;
   wherein the first program code is temporarily stored in the memory and has a program execution address, at least one function library is temporarily stored in the memory, the at least one function library comprises a first function and a second function, and the first function and the second function are located at a first function address and a second function address of the memory respectively;
   wherein when the processor is still executing the first program code and calls the first function, the translation circuit is utilized to translate the first program code to acquire the second function subsequent to the first function, and the processor acquires the second function address of the second function located in the memory;
   when the first program code calls the first function and the first function is executed completely, the processor directly executes the second function located at the second function address without returning to the program execution address.

2. The device of claim 1, wherein the second program code is able to be executed on a second processor, and the second processor and the processor are processors of different types.

3. The device of claim 1, wherein after the translation circuit has translated the second program code to the first program code completely, the processor executes the first program code.

4. The device of claim 1, wherein when the translation circuit has not translated the second program code to the first program code completely, the processor executes the first program code.

5. A binary-code translation method, comprising:
   translating a second program code to a first program code, wherein the first program code is temporarily stored in a memory and has a program execution address, at least one function library is temporarily stored in the memory, the at least one function library comprises a first function and a second function, and the first function and the second function are located at a first function address and a second function address of the memory respectively;
   causing the processor to execute the translated first program code;
   translating the first program code to acquire the second function subsequent to the first function and causing the processor to acquire the second function address of the second function located in the memory when the processor is still executing the first program code and calls the first function; and
   causing the processor to directly execute the second function located at the second function address without returning to the program execution address when the first program code calls the first function and the first function is executed completely.

6. The method of claim 5, wherein the second program code is able to be executed on a second processor, and the second processor and this processor are processors of different types.

7. The method of claim 5, wherein after the second program code is translated to the first program code completely, the processor executes the first program code.

8. The method of claim 5, wherein when the second program code has not translated the second program code to the first program code completely, the processor executes the first program code.

9. A binary-code translation device, comprising:
a processor; and
a memory,
wherein when the processor executes a first instruction for storing a variable to a first address of the memory and the variable is relevant with an address of the memory, if a second instruction for storing the variable to a second address of the memory exists subsequent to the first instruction and several instructions irrelevant with the variable exist between the first instruction and the second instruction, the processor only executes the first instruction.

10. A binary-code translation device, comprising:
a processor; and
a memory,
wherein when the processor executes a first instruction for accessing a variable from the memory to a first register and the variable is relevant with an address of the memory, if a second instruction for storing the variable from the memory to a second register exists subsequent to the first instruction and several instructions irrelevant with the variable exist between the first instruction and the second instruction, the processor only executes the second instruction.

\* \* \* \* \*